United States Patent
Namuduri et al.

(12) United States Patent     (10) Patent No.: US 7,334,670 B2
Namuduri et al.     (45) Date of Patent: Feb. 26, 2008

(54) TORQUE VECTORING DIFFERENTIAL FOR CONTROLLING VEHICLE STABILITY

(75) Inventors: Chandra S. Namuduri, Troy, MI (US); Balarama V. Murty, West Bloomfield, MI (US); Anthony L. Smith, Troy, MI (US); Jie Tong, Sterling Heights, MI (US); Mark A. Golden, Washington, MI (US); John C. Ulicny, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 98 days.

(21) Appl. No.: 11/112,445

(22) Filed: Apr. 22, 2005

(65) Prior Publication Data

US 2006/0052198 A1    Mar. 9, 2006

Related U.S. Application Data

(60) Provisional application No. 60/608,016, filed on Sep. 8, 2004.

(51) Int. Cl.
    *F16D 27/00* (2006.01)
(52) U.S. Cl. ........................................ 192/21.5
(58) Field of Classification Search .............. 192/21.5
See application file for complete search history.

(56) References Cited

U.S. PATENT DOCUMENTS

| | | | |
|---|---|---|---|
| 2,629,471 A * | 2/1953 | Rabinow | 192/21.5 |
| 2,818,150 A * | 12/1957 | Eck et al. | 192/144 |
| 3,026,978 A * | 3/1962 | Carrard | 477/217 |
| 3,666,466 A | 5/1972 | Strilko | 96/48 |
| 3,680,671 A * | 8/1972 | Hendershot et al. | 192/21.5 |
| 4,811,823 A * | 3/1989 | Raymond et al. | 192/21.5 |
| 4,987,230 A | 1/1991 | Monroe | 546/94 |
| 5,153,105 A | 10/1992 | Sher | 430/339 |
| 5,250,921 A * | 10/1993 | Van Laningham et al. | 335/296 |
| 5,415,598 A | 5/1995 | Sawase | 475/86 |
| 5,744,280 A | 4/1998 | Mooney, III | 430/270.1 |
| 5,845,752 A * | 12/1998 | Gopalswamy et al. | 192/21.5 |
| 6,290,043 B1 * | 9/2001 | Ginder et al. | 192/21.5 |
| 6,360,153 B1 | 3/2002 | Shinmura et al. | 701/48 |

(Continued)

FOREIGN PATENT DOCUMENTS

GB    2 365 084    2/2002

OTHER PUBLICATIONS

International Search Report for PCT/US05/28568 dated Dec. 1, 2006 corresponding to this application.

(Continued)

*Primary Examiner*—Roger Pang

(57) ABSTRACT

A magnetorheological (MR) fluid coupling for vectoring torque with respect to a shaft capable of rotary motion is disclosed. The coupling includes a stator, a rotor having a rotational degree of freedom with respect to the stator and configured for physical communication with the shaft, and a magnetic field generator. The stator and rotor define an annular space therebetween and are coupled via a MR fluid disposed within the annular space. The magnetic field generator is in field communication with the MR fluid and is disposed to produce a substantially radially directed magnetic field across the annular space. The rotor is rotationally responsive to the application of a magnetic field at the MR fluid.

18 Claims, 7 Drawing Sheets

U.S. PATENT DOCUMENTS

| | | |
|---|---|---|
| 6,543,595 B2 | 4/2003 | Okuma et al. ............. 192/84.1 |
| 6,581,739 B1 * | 6/2003 | Stretch et al. ............. 192/21.5 |
| 6,585,092 B1 * | 7/2003 | Smith et al. ............... 192/21.5 |
| 6,712,730 B2 * | 3/2004 | Gradu ........................ 475/218 |
| 6,805,651 B2 | 10/2004 | Lipman ...................... 475/221 |

OTHER PUBLICATIONS

Gradu, Mircea, "Torque Bias Coupling for AWD Applications", SAE Technical Paper Series, 2003; 01:0676.

Hamilton, Stuart et al., "Highly Responsive Mechatronic Differential for Maximizing Safety and Driver Benefits of Adaptive Strategies", SAE Technical Paper Series, 2004; 01:0859.

Wheals, Jonathan C. et al., "Torque Vectoring AWD Driveline: Design, Simulation, Capabilities and Control", SAE Technical Paper Series, 2004; 01:0863.

"Torque for Stability", Ricardo Quarterly Review, Summer 2004; 15-17.

* cited by examiner

TORQUE VECTORING DIFFERENTIAL FOR CONTROLLING VEHICLE STABILITY

CROSS REFERENCE TO RELATED APPLICATIONS

This application claims the benefit of U.S. Provisional Application Ser. No. 60/608,016, filed Sep. 8, 2004, which is incorporated herein by reference in its entirety.

BACKGROUND OF THE INVENTION

The present disclosure relates generally to a torque vectoring differential and method for controlling vehicle stability, and particularly to a magnetorheological actuator for purposes thereof.

A vehicle differential facilitates the distribution of the engine power to the wheels. It also facilitates the transmission of power to the wheels while allowing them to rotate at different speeds during a turn. It additionally acts as the final gear reduction in the vehicle.

In order to facilitate the distribution of power to the wheels, brakes and couplings are used for torque vectoring. These brakes and couplings can use magnetorheological fluids in order to effect torque vectoring in vehicles having 4-wheel drive and all-wheel drive arrangements. The magnetorheological fluids suffer from a number of drawbacks, one of which is the separation of the magnetizable particles from the carrier fluid. This results in a reduction in sensitivity over time as well as additional power consumption. It is therefore desirable to use couplings in which the magnetorheological fluid does not phase separate over time thereby preserving the systems sensitivity and quick response characteristics and which minimizes the amount of power used in order to control the vehicle stability.

BRIEF DESCRIPTION OF THE INVENTION

An embodiment of the invention includes a magnetorheological (MR) fluid coupling for vectoring torque with respect to a shaft capable of rotary motion. The coupling includes a stator, a rotor having a rotational degree of freedom with respect to the stator and configured for physical communication with the shaft, and a magnetic field generator. The stator and rotor define an annular space therebetween and are coupled via a MR fluid disposed within the annular space. The magnetic field generator is in field communication with the MR fluid and is disposed to produce a substantially radially directed magnetic field across the annular space. The rotor is rotationally responsive to the application of a magnetic field at the MR fluid.

Another embodiment of the invention includes a torque vectoring differential for vectoring torque across a set of sun gears via a shaft capable of rotary motion. The differential includes a first and a second magnetorheological (MR) clutch, where each MR clutch is in mechanical communication with the set of sun gears. Each MR clutch includes a stator, a rotor having a rotational degree of freedom with respect to the stator and configured for physical communication with the shaft, and a magnetic field generator. The stator and rotor define a cylindrical annular space therebetween and are coupled via a MR fluid disposed within the cylindrical annular space. The magnetic field generator is in field communication with the MR fluid and is disposed to produce a substantially radially directed magnetic field across the cylindrical annular space. The rotor is rotationally responsive to the application of a magnetic field at the MR fluid. In response to an applied magnetic field at the first MR clutch, torque vectoring results in a first direction across the sun gears, and in response to an applied magnetic field at the second MR clutch, torque vectoring results in a second direction opposite to the first direction across the sun gears.

A further embodiment of the invention includes a method of torque vectoring by changing the gear ratio across a set of sun gears. A magnetic field is applied to a magnetorheological (MR) fluid contained in a cylindrical annular space disposed between a drum-like rotor and a stator of a MR clutch, the rotor being in physical communication with a shaft that may undergo rotary motion, the set of sun gears being responsive to a torque at the shaft. In response to the application of the magnetic field at the cylindrical annular space, a rotational velocity of the rotor with respect to the stator is changed.

DETAILED DESCRIPTION OF THE INVENTION

Disclosed herein are couplings that facilitate torque vectoring in vehicle differentials, which employ magnetorheological (MR) fluids that do not undergo substantial phase separation or separation due to density differences over time. The MR fluid enables torque modulation capabilities and torque characteristics that are relatively independent of the differential speed of the coupling. Features of the system include at least one axially oriented gap that contains the MR fluid between the two parts of the coupling to prevent particle separation. The MR fluid is advantageously synthesized to minimize particle separation under high centrifugal forces, which facilitates the generation of high yield stress for a given flux density, and may also facilitate an increase in the sensitivity of the coupling, a reduction in the coupling size, a reduction in the coil power utilized, and an increase in the speed of response and torque capacity.

In addition to the use of the MR fluid, an exemplary coupling in accordance with embodiments of the invention provides a reservoir arrangement for the MR fluid that provides a space to accommodate volumetric variations due to thermal effects, while minimizing particle separation and coagulation in the MR fluid. Parts of the magnetic circuit in an exemplary coupling are manufactured from a solid magnetically permeable material that permits the magnetic field to be applied uniformly thereby minimizing particle separation. Exemplary couplings may employ single or multiple coils embedded in the stationary magnetic core to provide a magnetic field across the MR fluid so as to vary the torque transmitted between the two members of the coupling. Solid non-magnetic portions are utilized to hold parts of the magnetic circuit on the stator and the rotor ring portions of the coupling. A sealing arrangement is also provided to prevent the MR fluid from leaking away from the working gap.

Figure 1:
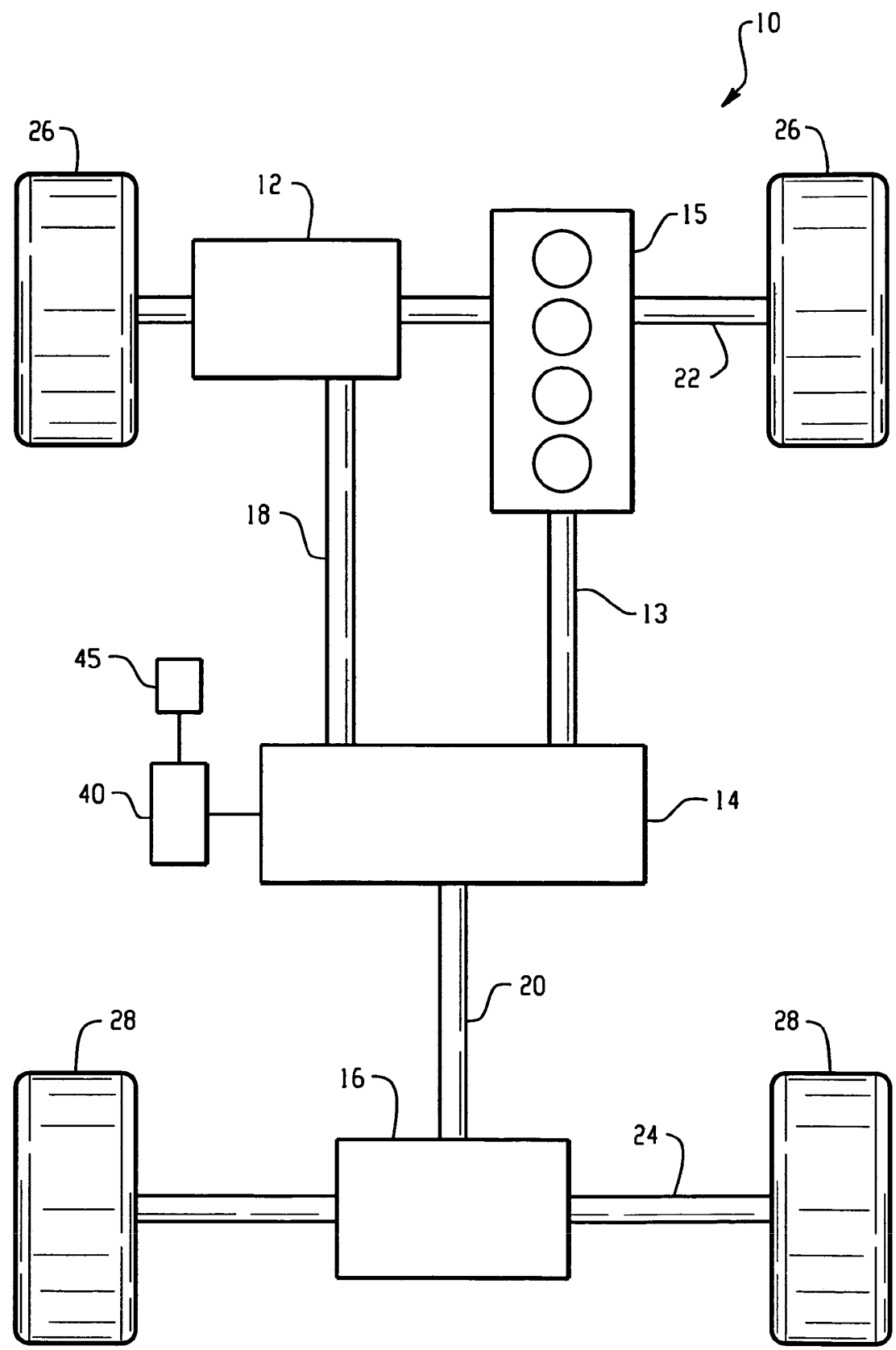
FIG. 1 depicts in block view an exemplary all-wheel drive vehicle for use in accordance with an embodiment of the invention.

With reference now to the FIG. 1, a system 10 depicts an exemplary embodiment of an all-wheel drive vehicle, wherein the front propulsion shaft 18, which is coupled to one output of the transfer case 14 (alternatively termed the power transfer unit), drives the input to the front differential 12, while the rear propulsion shaft 20, which is coupled to a second output of the transfer case 14, drives the input to the rear differential 16. A drive shaft 13 couples the engine/transmission 15 to the transfer case 14. In an embodiment of a permanent 4-wheel drive (4WD) vehicle, the transmission output torque from the engine/transmission 15 is fed into the transfer case 14 with a center differential, which distributes the torque with a static ratio (such as 50:50 or unequal torque distribution, for example) to the front and rear axles 22, 24. In both axles, the input torque is then distributed to the wheels 26, 28 by the differentials 12, 16 with a static torque distribution, such as 50:50 for example. In an on-demand 4WD vehicle, one axle is directly driven while the second axle is indirectly driven. The indirectly driven axle is generally driven-on-demand via the transfer case 14 and a coupling 200 (see FIG. 3 and discussion below). On-demand 4WD vehicles are available with primarily driven front axles 22 as well as with primarily driven rear axles 24. Additional couplings may be used within the center differential and/or front and rear differentials to transfer torque as demanded.

All these different driveline configurations cause varying traction and vehicle dynamics. For extreme performance demands on vehicle dynamics, the torque delivered to each of the individual wheels is generally managed using electronically controllable couplings in the center differential 14, as well as front 12 and rear 16 differentials.

Figure 2:
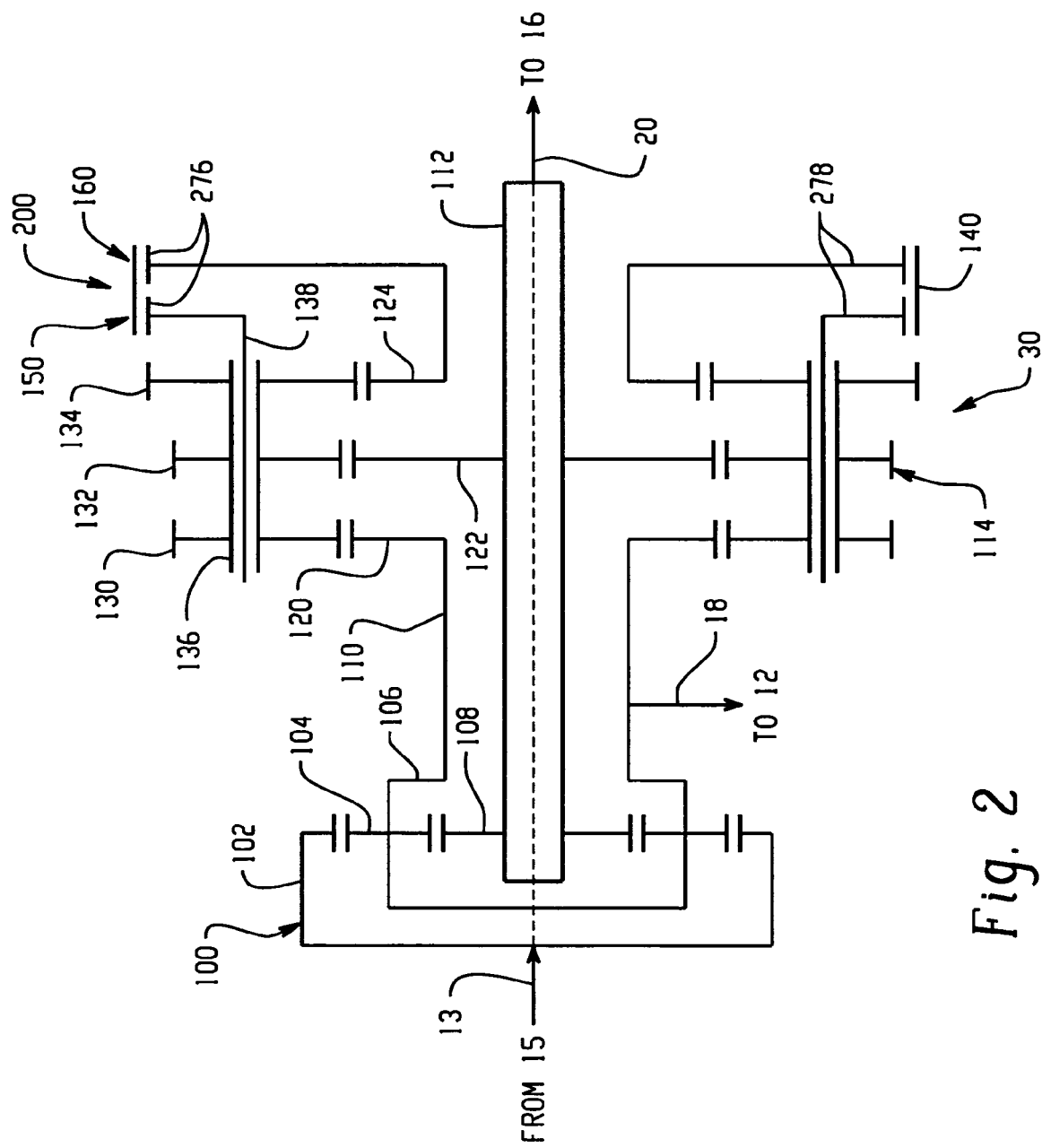
FIG. 2 depicts in schematic view an exemplary torque vectoring differential in accordance with an embodiment of the invention.

FIG. 2 depicts in schematic view an exemplary embodiment of a torque vectoring differential (TVD) 30 that may be used (see FIG. 1 for example) as a center 14, a front 12, or a rear 16, differential. However, for discussion purposes only, reference will hereinafter be made to a TVD 30 that is used as a center differential 14, but it will be appreciated that the scope of the invention is not so limited.

Referring now to FIG. 2, TVD 30 receives torsional input from engine/transmission 15 via drive shaft 13, and is productive of torsional output to front differential 12 via front propulsion shaft 18, and of torsional output to rear differential 16 via rear propulsion shaft 20.

In an embodiment, TVD 30 includes an epicyclic differential gear system 100 having an annulus 102 with an annular array of gear teeth that mesh with a number of planet gears 104. Planet gears 104 are carried by a common carrier 106 and mesh with a sun gear 108. Carrier 106 is connected to a first output shaft 110 that provides torsional output to front propulsion shaft 18. Sun gear 108 is carried by a second output shaft 112 that provides torsional output to rear propulsion shaft 20. The two output shafts 110, 112 are coupled via another epicyclic differential gear system 114.

In an embodiment, epicyclic differential gear system 114 includes a sun gear 120 and a coaxial sun gear 122. Concentrically mounted with sun gears 120, 122 is another sun gear 124. All three sun gears 120, 122, 124 are in mesh with respective planet gears 130, 132 and 134, which are mounted to rotate around a respective planet shaft 136, which in turn are connected to a common carrier 138. Projecting radially from common carrier 138 are one or more MR fluid couplings 200, also herein referred to as a MR clutch, and separately referred to as a rear MR clutch 150 and a front MR clutch 160. MR clutches 150 and 160 are connected via a common fixed structure 140, and may be separately operable via a signal from a controller 40 that receives signals from one or more sensors 45 (depicted in FIG. 1).

The gear ratios of each meshing sun gear 120, 122, 124 and planet gear 130, 132, 134 are all different, such that when in use, activation of front MR clutch 160 slows down sun gear 124, resulting in a ratio change across sun gears 120 and 122, which in turn produces a torque transfer from the rear (second) output shaft 112 to the front (first) output shaft 110. Conversely, activation of rear MR clutch 150 results in common carrier 138 slowing down, which induces a ratio change across sun gears 120 and 122, and results in a torque transfer from the front (first) output shaft 110 to the rear (second) output shaft 112. A small ratio change across sun gears 120 and 122 results in a torque difference between shafts 18 and 20. As can be seen by the foregoing discussion, torque vectoring requires the use of two MR clutches 200.

In accordance with embodiments of the invention, MR clutch 200 employs a drum-like rotor, which will now be discussed with reference to FIGS. 3-7.

Figure 3:
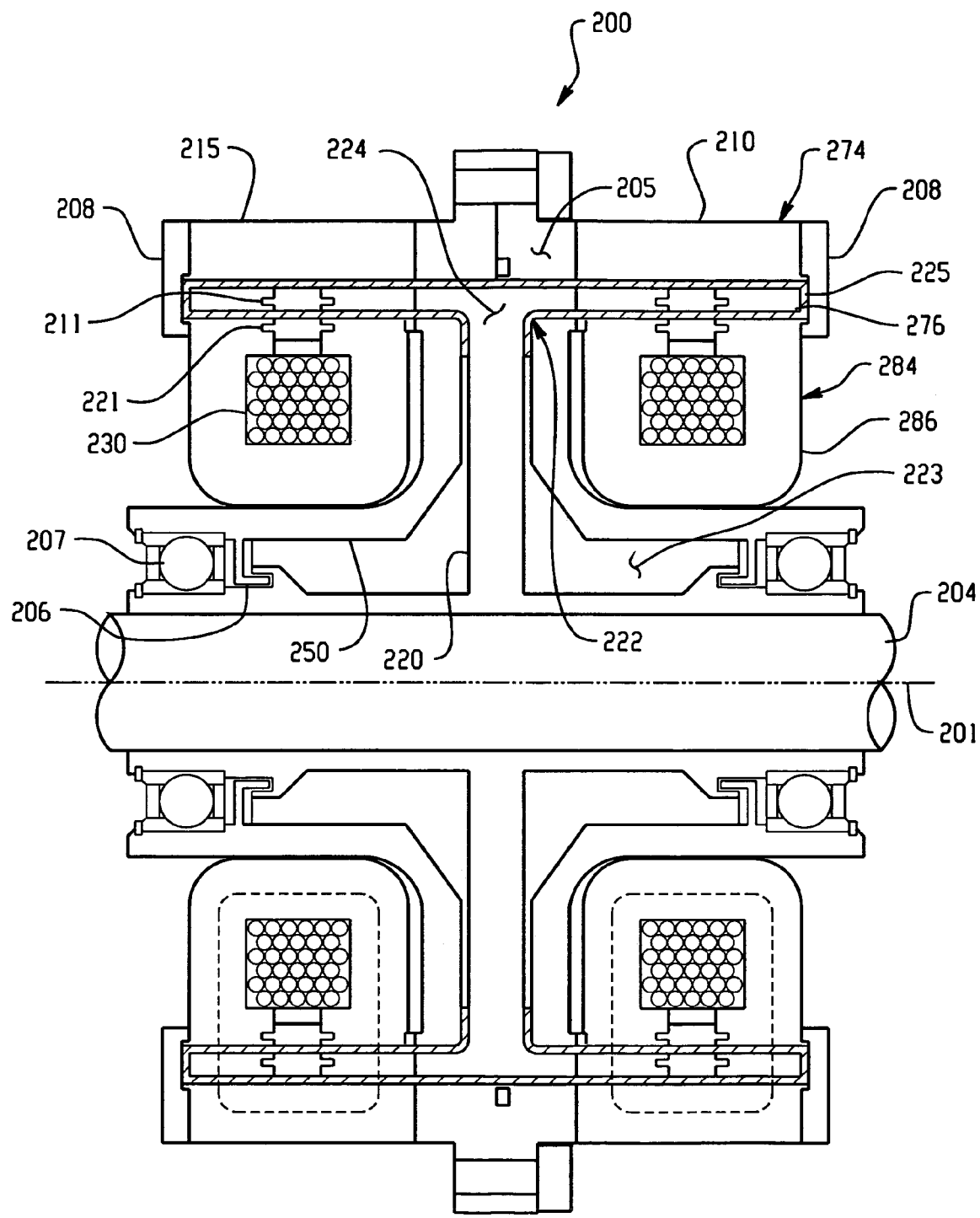
FIGS. 3-7 depict alternative exemplary embodiments of a magnetorheological fluid coupling in accordance with an embodiment of the invention.

Referring first to FIG. 3, a cut away cross-section of an exemplary MR fluid coupling 200 for torque vector differentiation is depicted. In general, the MR coupling 200 utilizes a MR fluid 222 dispensed in a void that includes a double annular space 225 between concentric cylinders 274, 276, and 284, where it is subjected to a controllable magnetic field. One of the concentric cylinders 276 defines a rotor ring, while the other cylinder structures 274 and 284 define a stator. The combination of concentric cylinder surfaces defined by 274, 276 and 284, results in annular space 225 having a cylindrical shape. Under zero magnetic field, the MR fluid 222 (depicted in cross-hatching) may be sheared easily producing little resistance to rotation, whereas under higher magnetic fields, the MR fluid 222 exhibits a high yield stress that resists rotation and therefore generates significant opposing torque on the rotor ring 276 within the MR fluid coupling 200. The active annular space 225 is generally disposed at a radial distance from the axis 201 of MR coupling 200 and is oriented parallel to axis 201, and may include a circular loop that is in fluid communication with a fluid reservoir 223, which may be used for containing an overfill of MR fluid 222. As used herein, the term active annular space 225 refers to that portion of the annular space 225 that contains the MR fluid 222 that is primarily responsible for causing a braking action of rotor ring 276 in response to an activated coil 230. As used hereinafter, the term active annular space 225 and annular space 225 are used interchangeably.

In an embodiment, stator 274 includes a stationary non-magnetic portion 205, a stationary magnetic stator portion 210, a stationary magnetic portion 215, and a stationary non-magnetic portion 208, and stator 284 includes a stationary non-magnetic portion 221 and a stationary magnetic portion 286. Elements 205, 210, 215, 208, 221, and 286, are also herein referred to collectively as the stator, with each set of magnetic portions about a respective coil 230 defining part of a magnetic circuit with flux lines that traverse the annular space 225 that contains the MR fluid 222. The other part of the magnetic circuit is defined by magnetic rotor ring 276 having a non-magnetic portion 211. Rotor ring 276 is connected to a shaft 204 via a central rib 220, which itself has a non-magnetic portion 224. On the rear MR clutch 150, shaft 204 is attached to common carrier 138, and on the front MR clutch 160, shaft 204 is attached to sun gear 124. In an embodiment, shaft 204 may be a hollow coaxial shaft with one shaft portion coupled to rear MR clutch 150, and another shaft portion coupled with front MR clutch 160. By comparing FIGS. 2 and 3, it can be readily seen that fixed structure 140 is representative of the stator 274 of both the front and the rear MR clutches 150, 160, and that the drum-like rotor ring 276 with attached rib 278 is depicted as a "T" structure in FIG. 2. In an embodiment, stator portions 205, 210 and 215 are stationary. However, in an alternative embodiment 205, 210 and 215 may be configured to rotate, in which case slip rings could be employed in order to get operational power to coil 230.

Referring still to FIG. 3, stator portions 274 and 284 are coupled with the rotor ring 276 via the MR fluid 222 within the annular space 225, which is in field communication with magnetic field generator 230 (also herein referred to as a coil) via the flux path defined by the magnetic and non-magnetic portions of stator 274 and 284, and the rotor ring 276.

In use, the shear stress characteristic of the MR fluid 222 within annular space 225 is responsive to a magnetic field from magnetic field generator 230, such that a rotational braking action of rotor ring 276 results from field excitation at magnetic field generator 230. The effect of the braking action on the rotor ring 276 permits the use of torque vectoring differentials, which provides for increased stability of a vehicle. The braking action on the rotor ring 276 may also be used in other areas of a vehicle, such as for the coupling or decoupling of gears for example. In the case where stator portions 205, 210 and 215 are configured to rotate, then the relative slip between rotor ring 276 and stator 274 would tend to decrease with increasing magnetic field.

In the exemplary embodiment depicted in the FIG. 3, the two sections of the stator 274 and 284 are disposed on opposing sides of the rotor ring 276, where the annular space 225 extends between the opposing surfaces of the stator 274, 284 and the rotor ring 276. Both the stator 274, 284 and the rotor ring 276 are manufactured from a magnetizable material with non-magnetic portions, as discussed above. The electrical coil 230 is disposed in the stator 284 at a radial distance from axis 201 and enables magnetization of the rotor ring 276 and the stator 274, 284. As depicted in FIG. 3, MR fluid coupling 200 may have two coils 230, one on either side of the central rib 220. The exemplary coupling 200 of FIG. 3 has two annuli 225, one on either side of the central rib 220, and a single rotor ring 276 in fluid communication with the two annuli 225. However, other configurations of the MR coupling may also be effectively used. Some other variations are shown in the FIGS. 4 through 7.

Figure 4:
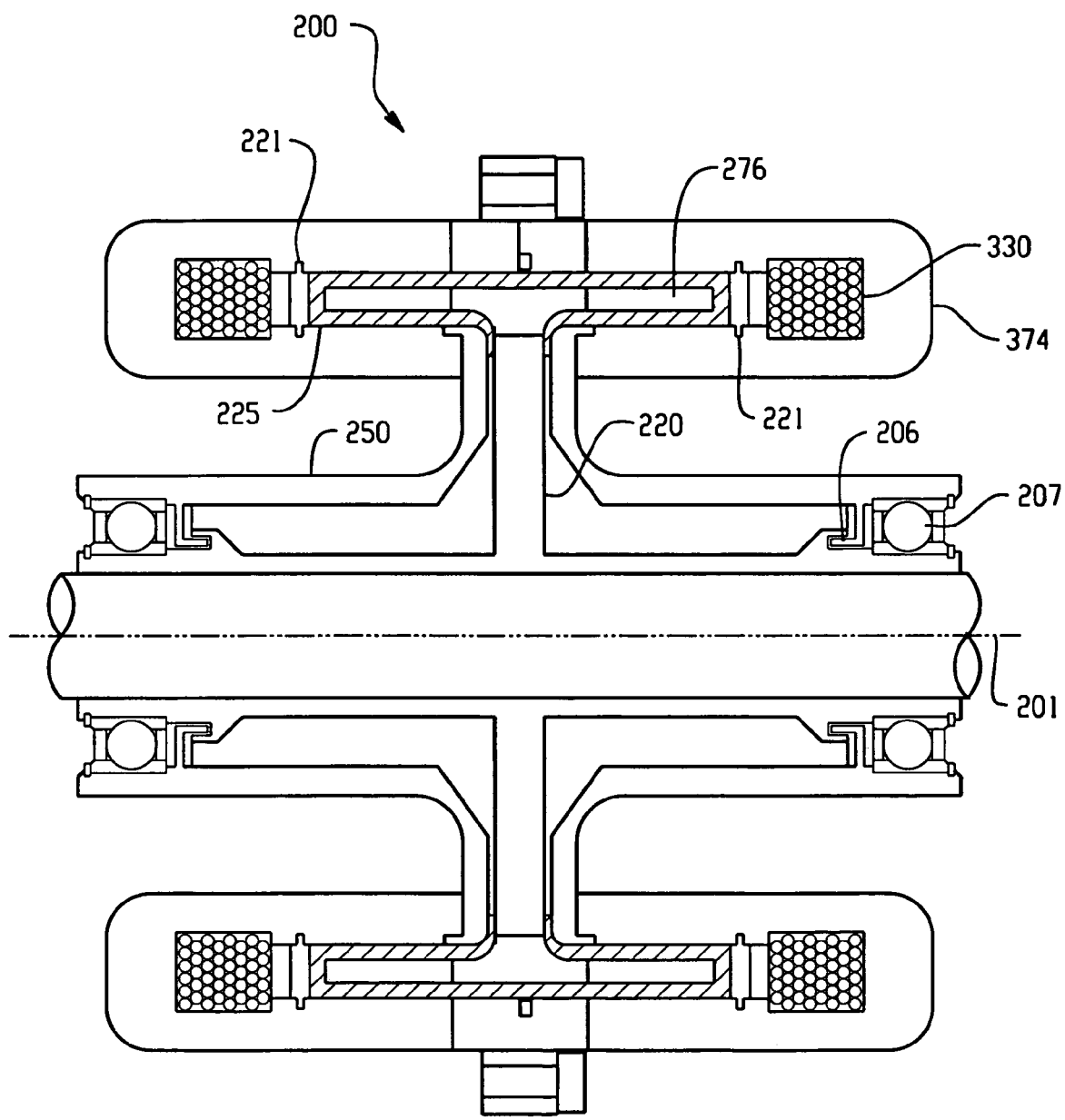

FIG. 4 depicts a cut-away section of an exemplary alternative coil arrangement 330. In FIG. 4, the MR fluid coupling 200 includes a double coil 330, a double annular space (also termed a gap) 225 and a single rotor ring 276. In FIG. 4, however, the coils 330 are disposed in an outer core 374 with non-magnetic portions 221.

While certain magnetic and non-magnetic parts illustrated and discussed in reference to FIG. 3 are not specifically discussed in reference to FIGS. 4-7, it will be appreciated by one skilled in the art that the discussion of magnetic and non-magnetic parts made in reference to FIG. 3 is also applicable to similar parts employed and illustrated in FIGS. 4-7, which depict alternative embodiments of the invention illustrated in FIG. 3.

Figure 5:
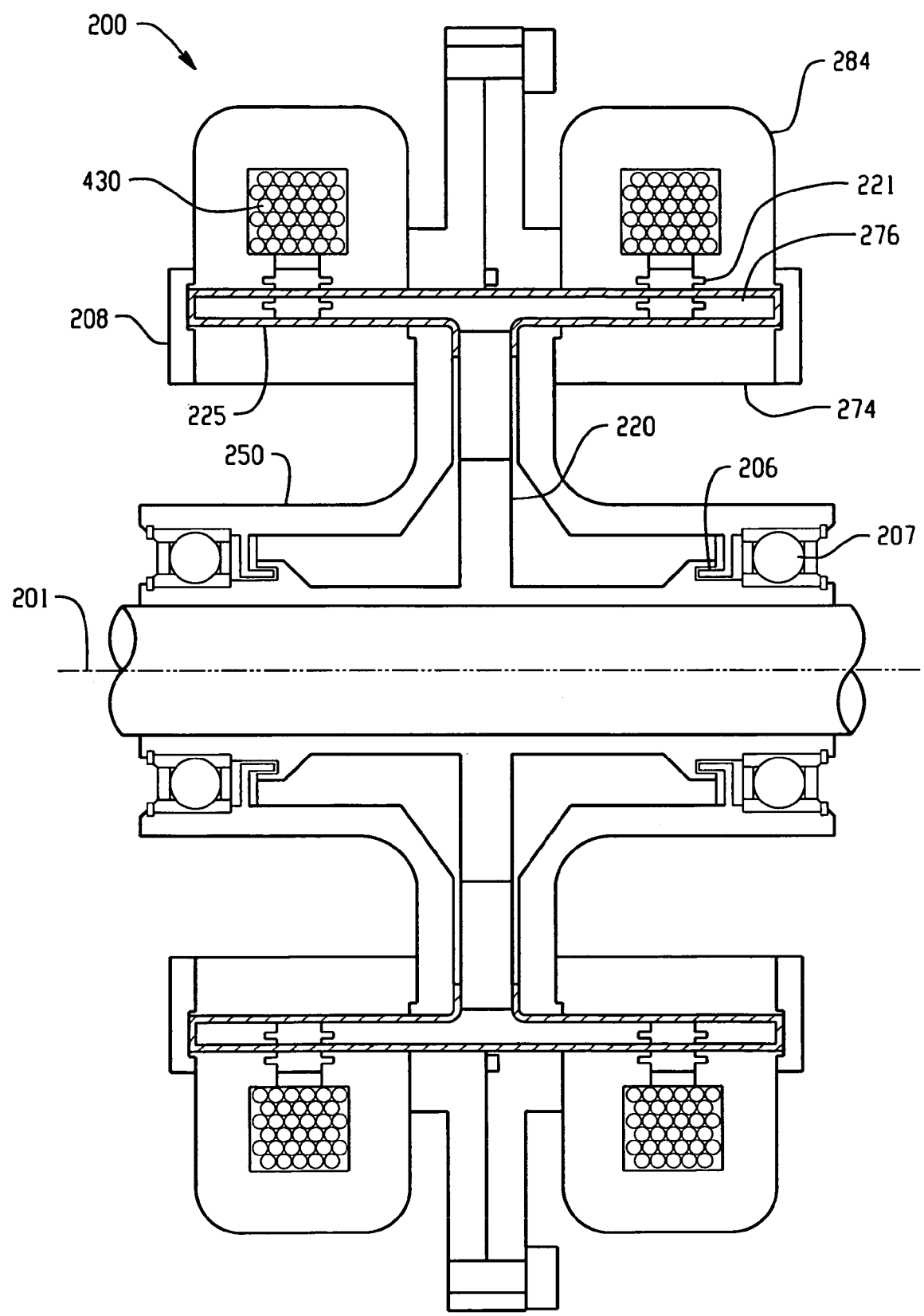

FIG. 5 represents another exemplary embodiment of a Cut-away section of the MR fluid coupling 200. In the FIG. 5, the MR fluid coupling 200 includes a double coil 430, a double annular space 225 and a single rotor ring 276. In FIG. 5, the stator 284 and coil 430 are mounted radially outward of the rotor ring 276.

Figure 6:
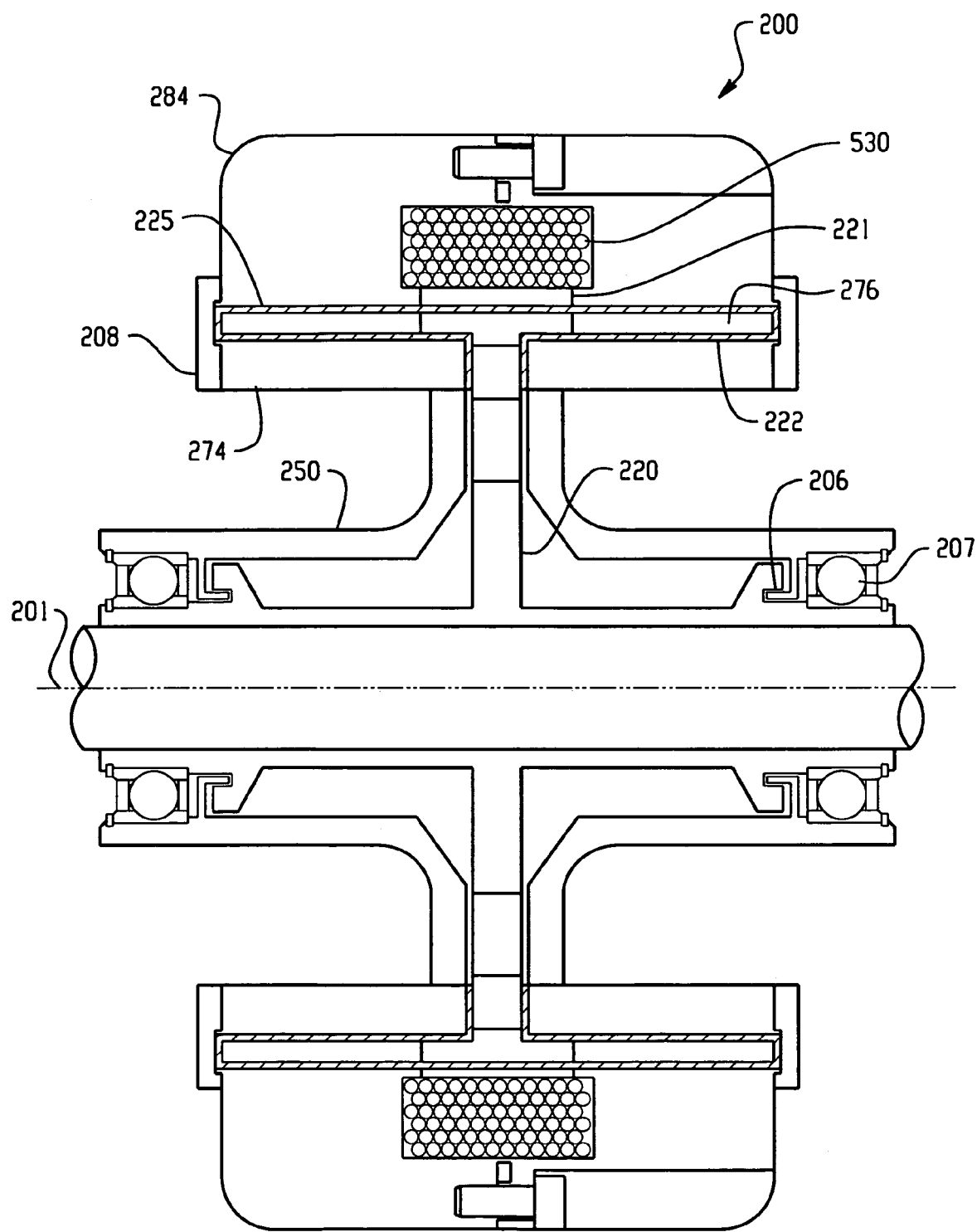

FIG. 6 represents another exemplary embodiment of a cut-away section of the MR fluid coupling 200. In the FIG. 6, the MR fluid coupling 200 includes a single coil 530, a double annular space 225, and a single rotor ring 276. The coil 530 is stationary, along with stator 284 and stator 274. The central rib 220 is part of the rotor ring 276.

Figure 7:
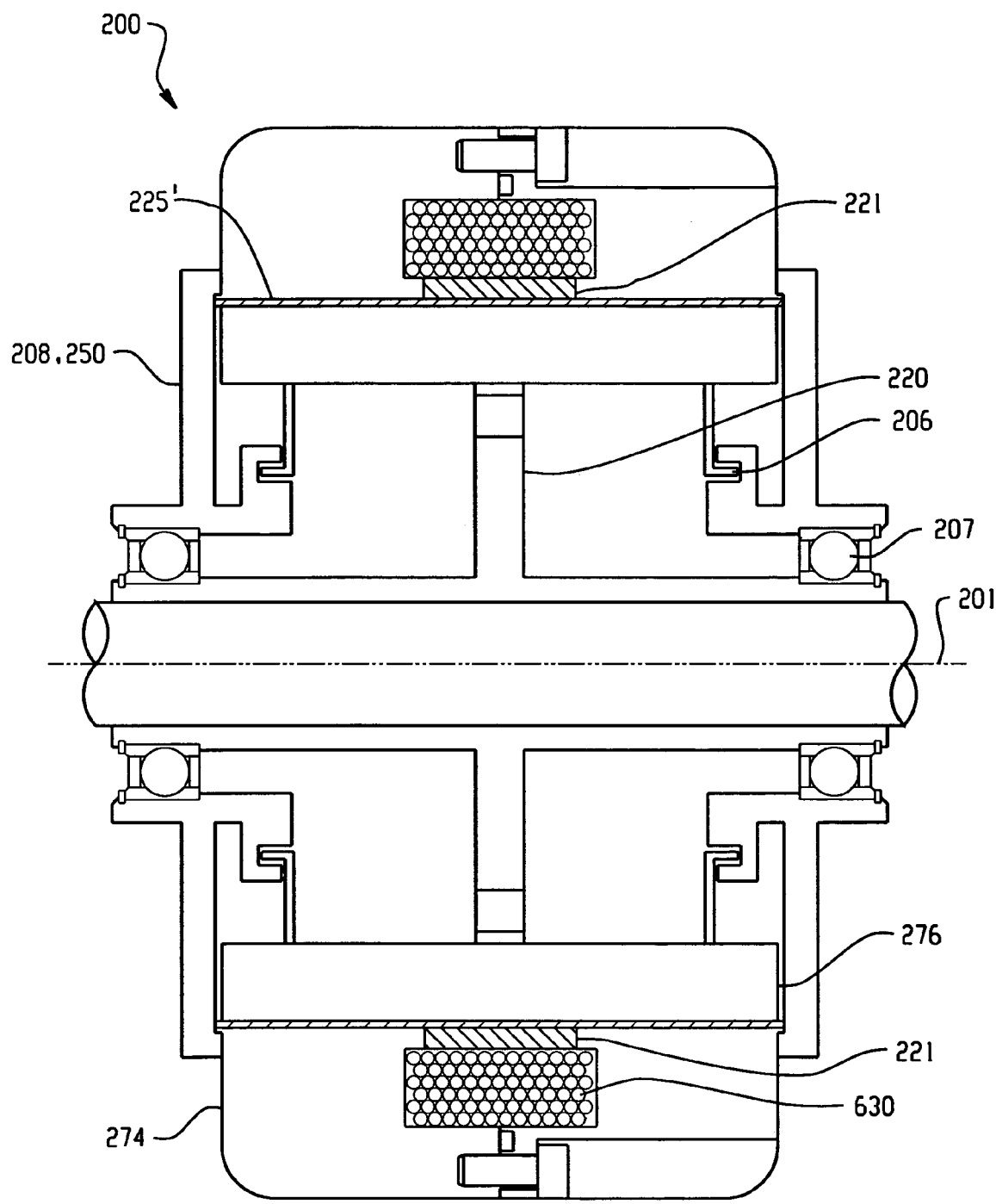

FIG. 7 represents another exemplary embodiment of a cut-away section of the MR fluid coupling 200 comprising a single coil 630, a single annular space 225' and a single ring rotor 276. As with other coils, coil 630 is insulated from the single annular space 225' by the non-magnetic portion 221 to prevent contact between the windings of coil 630 and the MR fluid 222.

The MR coupling 200 of the FIGS. 3 through 7 have a number of portions that are manufactured from non-magnetic materials. With respect to coupling 200 of FIG. 3, exemplary non-magnetic portions include elements enumerated by reference numerals 205, 208, 211, 224, 250, and 221, thereby providing an effective magnetic flux path through stator portion 286 about coil 230, across annular space 225 and rotor ring 276, and through stator portion 274. Examples of suitable non-magnetic materials are stainless steel, aluminum, brass, plastics, or the like, or a combination comprising at least one of the foregoing non-magnetic materials. Alternatively, an air gap may be employed in place of or in addition to the use of non-magnetic portions. The non-magnetic materials are used to prevent the diversion of magnetic flux away from the annular space 225 through which the MR fluid 222 flows. The rotor ring 276 and the magnetic portions of stator portions 274, 284 are made of magnetizable materials. Examples of suitable magnetizable materials are iron, steel, carbonyl iron, or the like, or a combination comprising at least one of the foregoing magnetizable materials. The use of a magnetizable material permits the application of a substantially uniform magnetic field across the MR fluid 222 within the annular space 225. This provides for a substantially uniform increase in effective viscosity of the MR fluid 222 upon the application of the magnetic field from coil 230.

When an electrical current is passed through coil 230 from an external source such as the vehicle battery (not shown), a magnetic field is produced in the substantially radial direction with respect to axis 201 across annular space 225 between stator portions 274, 284, and magnetic rotor ring 276. As used herein, the term substantially radial direction is intended to refer to a magnetic field that is mostly radial across the annular space, but that may also have an axial component at some locations. The middle portion 211 of the rotor ring 276 and the middle portion 221 of the stator 284 are made up of substantially non-magnetic material (such as, stainless steel, aluminum, brass, for example) or made of such thickness that it prevents significant amount of magnetic flux being diverted away from the outer portion of annular space 225. The strength of the magnetic field or flux density within MR fluid 222 determines the shear stress characteristics of MR fluid 222, thereby controlling the degree of torque that acts to resist the rotation of magnetic rotor ring 276.

The annular space 225 is in physical communication with a reservoir 223, which contains an excess of the MR fluid 222. The reservoir carries a slight excess volume of MR fluid when compared with the volume of the annular space 225. The excess may be greater than or equal to about 10 volume percent. In an embodiment, the excess is greater than or equal to about 15 volume percent. In another embodiment, the excess is greater than or equal to about 20 volume percent. An exemplary MR coupling 200 is one that utilizes a minimum amount of MR fluid 222 and achieves the required locking force while transmitting minimum force during an unlocked condition. In an embodiment, the amount of MR fluid 222 used is equal to or less than about 200 cubic centimeters (cc), and preferably equal to or less than about 100 cc, and more preferably equal to or less than about 50 cc.

The MR fluid composition 222 generally comprises magnetizable particles, a carrier fluid and additives. The magnetizable particles of the MR fluid composition are comprised of, for example, paramagnetic, superparamagnetic, ferromagnetic compounds, or a combination comprising at least one of the foregoing compounds. Examples of specific magnetizable particles are particles comprised of materials such as iron, iron oxide, iron nitride, iron carbide, carbonyl iron, chromium dioxide, low carbon steel, silicon steel, nickel, cobalt, or the like, or a combination comprising at least one of the foregoing. The iron oxide includes all forms of pure iron oxide, such as, for example, $Fe_2O_3$ and $Fe_3O_4$, as well as those containing small amounts of other elements, such as, manganese, zinc or barium. Specific examples of iron oxide include ferrites and magnetites. In addition, the magnetizable particles can be comprised of alloys of iron, such as, for example, those containing aluminum, silicon, cobalt, nickel, vanadium, molybdenum, chromium, tungsten, manganese, copper, or a combination comprising at least one of the foregoing metals.

The magnetizable particles may also be comprised of specific iron-cobalt and iron-nickel alloys. Exemplary iron-cobalt alloys have an iron to cobalt ratio ranging from about 30:70 to about 95:5. In an embodiment, the iron-cobalt alloys have an iron to cobalt ratio ranging from about 50:50 to about 85:15. The iron-nickel alloys have an iron to nickel ratio ranging from about 90:10 to about 99:1. In an embodiment, the iron-nickel alloys have an iron to cobalt ratio ranging from about 94:6 to about 97:3. The aforementioned iron-cobalt and iron-nickel alloys may also contain a small amount of additional elements, such as, for example, vanadium, chromium, or the like, in order to improve the ductility and mechanical properties of the alloys.

These additional elements are typically present in an amount that is less than about 3.0% by weight, based on the total weight of the magnetizable particles. Examples of the commercially available iron-cobalt alloys are HYPERCO® from Carpenter Technology, HYPERM® from F. Krupp Widiafabrik, SUPERMENDUR® from Arnold Engineering and 2V-PERMENDUR® from Western Electric.

The magnetizable particles are generally obtained from processes involving the reduction of metal oxides, grinding or attrition, electrolytic deposition, metal carbonyl decomposition, rapid solidification, or smelt processing. Examples of suitable metal powders that are commercially available are straight iron powders, reduced iron powders, insulated reduced iron powders, cobalt powders, or the like, or a combination comprising at least one of the foregoing metal powders. Alloy powders can also be used. A suitable example of an alloy powder is one comprising 48 wt % iron, 50 wt % cobalt and 2 wt % vanadium from UltraFine Powder Technologies.

Exemplary magnetizable particles are those that contain a majority of iron in any one of its chemically available forms. Carbonyl iron powders that are made by the thermal decomposition of iron pentacarbonyl are generally desirable for use in a MR fluid composition. Carbonyl iron of the preferred form is commercially available from ISP Technologies, GAF Corporation and/or BASF Corporation.

The magnetizable particles generally have an aspect ratio of about 1 and have an average particle size of about 0.1 micrometers to about 500 micrometers. In an embodiment, the magnetizable particles have an average particle size of about 1 micrometer to about 250 micrometers. In another embodiment, the magnetizable particles have an average particle size of about 10 micrometers to about 100 micrometers. In yet another embodiment, the magnetizable particles have an average particle size of about 20 micrometers to about 80 micrometers. The magnetizable particles may have a bimodal or higher (n-modal for example, where n is equal to or greater than 3) particle size distribution. High aspect ratio magnetizable particles having an aspect ratio of greater than or equal to about 1.5 may also be used if desired.

The number of magnetizable particles in the MR fluid composition depends upon the desired magnetic activity and viscosity of the fluid, but may be from about 0.01 to about 60 volume percent, based on the total volume of the MR fluid composition 222. In one embodiment, the number of magnetizable particles in the MR fluid composition 222 may be from about 1.5 to about 50 volume percent, based on the total volume of the MR fluid composition 222.

The carrier fluid forms the continuous phase of the MR fluid composition 222. Examples of suitable carrier fluids are natural fatty oils, mineral oils, polyα-olefins, polyphenylethers, polyesters (such as perfluorinated polyesters, dibasic acid esters and neopentylpolyol esters), phosphate esters, synthetic cycloparaffin oils and synthetic paraffin oils, unsaturated hydrocarbon oils, monobasic acid esters, glycol esters and ethers (such as polyalkylene glycol), synthetic hydrocarbon oils, perfluorinated polyethers, halogenated hydrocarbons, or the like, or a combination comprising at least one of the foregoing carrier fluids.

Exemplary carrier fluids are those which are non-volatile, non-polar and do not contain amounts of water greater than or equal to about 5 wt %, based upon the total weight of the carrier fluid. Examples of hydrocarbons are mineral oils, paraffins, or cycloparaffins. Synthetic hydrocarbon oils include those oils derived from oligomerization of olefins such as polybutenes and oils derived from high molecular weight alpha olefins having about 8 to about 20 carbon atoms by acid catalyzed dimerization and by oligomerization using trialuminum alkyls as catalysts.

The carrier fluid is generally present in an amount of about 40 to about 99.999 volume percent, based upon the total volume of the MR fluid composition 222. In an embodiment, the carrier fluid is generally present in an amount ranging from about 50 to about 99 volume percent, based upon the total volume of the MR fluid composition 222.

The MR fluid composition 222 may optionally include other additives such as a thixotropic agent, a carboxylate soap, an antioxidant, a lubricant, a viscosity modifier, a sulfur-containing compound, a ZD DP-type compound, or a combination comprising at least one of the foregoing additives. If present, these optional additives may be present in an amount of about 0.25 to about 10 volume percent, based upon the total volume of the MR fluid. In an embodiment, these optional additives are present in an amount of about 0.5 to about 7.5 volume percent, based upon the total volume of the MR fluid. Exemplary thixotropic agents include polymer-modified metal oxides. The polymer-modified metal oxide may be prepared by reacting a metal oxide powder with a polymeric compound that is compatible with the carrier fluid and capable of shielding substantially all of the hydrogen-bonding sites or groups on the surface of the metal oxide from any interaction with other molecules.

Examples of suitable metal oxide powders include precipitated silica gel, fumed or pyrogenic silica, silica gel, titanium dioxide, and iron oxides such as ferrites or magnetites, or the like, or a combination comprising at least one of the foregoing metal oxide powders.

Examples of suitable polymeric compounds useful in forming the polymer-modified metal oxides include thermosetting polymers, thermoplastic polymers or combinations of thermosetting polymers with thermoplastic polymers. Examples of polymeric compounds are oligomers, polymers, copolymers such as block copolymers, star block copolymers, terpolymers, random copolymers, alternating copolymers, graft copolymers, or the like, dendrimers, ionomers, or the like, or a combination comprising at least one of the foregoing. Examples of suitable polymers are polyacetals, polysiloxanes, polyurethanes, polyolefins, polyacrylics, polycarbonates, polyalkyds, polystyrenes, polyesters, polyamides, polyaramides, polyamideimides, polyarylates, polyarylsulfones, polyethersulfones, polyphenylene sulfides, polysulfones, polyimides, polyetherimides, polytetrafluoroethylenes, polyetherketones, polyether etherketones, polyether ketone ketones, polybenzoxazoles, polyoxadiazoles, polybenzothiazinophenothiazines, polybenzothiazoles, polypyrazinoquinoxalines, polypyromellitimides, polyquinoxalines, polybenzimidazoles, polyoxindoles, polyoxoisoindolines, polydioxoisoindolines, polytriazines, polypyridazines, polypiperazines, polypyridines, polypiperidines, polytriazoles, polypyrazoles, polycarboranes, polyoxabicyclononanes, polydibenzofurans, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, polysiloxanes, phenolics, epoxies, or combinations comprising at least one of the foregoing organic polymers.

A polymer-modified metal oxide, in the form of fumed silica treated with a siloxane oligomer, can be commercially obtained under the trade names AEROSIL® and CABO-SIL® from DeGussa Corporation and Cabot Corporation, respectively.

Examples of the carboxylate soap include lithium stearate, lithium-12-hydroxystearate, calcium stearate, aluminum stearate, ferrous oleate, ferrous stearate, zinc stearate, sodium stearate, strontium stearate, or the like, or a combination comprising at least one of the foregoing carboxylate soaps.

Examples of sulfur-containing compounds include thioesters such as tetrakis thioglycolate, tetrakis(3-mercaptopropionyl) pentaerithritol, ethylene glycoldimercaptoacetate, 1,2,6-hexanetriol trithioglycolate, trimethylol ethane tri(3-mercaptopropionate), glycoldimercaptopropionate, bisthioglycolate, trimethylolethane trithioglycolate, trimethylolpropane tris(3-mercaptopropionate) and similar compounds and thiols such as 1-dodecylthiol, 1-decanethiol, 1-methyl-1-decanethiol, 2-methyl-2-decanethiol, 1-hexadecylthiol, 2-propyl-2-decanethiol, 1-butylthiol, 2-hexadecylthiol, or the like, or a combination comprising at least one of the foregoing sulfur-containing compounds.

In general, it is desirable for the MR fluid composition 222 to have a viscosity of about 50 to about 500 centipoise at 40° C. in the off-state. On-state yield stresses for MR fluid compositions 222 are about 10 to about 1000 kilopascals (about 1.5 to about 150 pound per square inch). These yield stresses would be measured at magnetic flux densities on the order of about 1 to about 2 tesla (that is, when the particles are magnetically saturated).

The MR coupling 200 employs a number of seals in different configurations in order to prevent the MR fluid 222 from leaking and also to minimize damage to the rotor rings 276, the stator 274, 284 or the coil 230. For example a labyrinth-like seal 206 is used to prevent the MR fluid 222 from escaping from the MR fluid reservoir 223. In an embodiment, this seal is accomplished using a tight fit having a geometry effective to prevent the MR fluid 222 from escaping from the reservoir 223. Similarly, other seals may be used. For example, the coil 230 is sealed by non-magnetic abrasion resistant ring 221 to prevent intrusion of MR fluid, particularly the base fluid component. Alternatively, the coil 230 may be hermetically sealed (encapsulated) to isolate the coil wiring from the MR fluid 222.

If the coil assembly 230 is hermetically sealed (encapsulated), the material used for the sealing should be capable of withstanding abrasion due to exposure to MR fluid 222. Similarly, the entry point for coil wires into the internals of the coupling itself is provided with seal against water intrusion, or the like. Sealed bearings 207 are used to isolate the MR coupling area from the differential itself. This prevents cross-contamination of differential lubricant and MR fluid 222. It is desirable for seals to have an adequate PV (pressure/velocity factor) rating. It is also desirable for seals to withstand the operating temperatures and to be compatible with all fluids that they will be in contact with.

In an embodiment and in a manner of using the MR coupling 200, when a magnetic field is applied to the MR coupling 200, the field energizes the magnetizable particles in the MR fluid 222. The fluid 222 that is now in the "on-state" undergoes an increase in viscosity due to the alignment of the particles with the applied magnetic field. By activating the rear MR clutch 150 or the front MR clutch 160, a torque may be transferred in a first direction or a second opposite direction across sun gears 120, 122, thereby resulting in torque vectoring. In an embodiment, the torque transferred is in direct proportion to the change in the viscosity of the MR fluid 222, which varies with the intensity of the applied magnetic field.

The exemplary configurations disclosed herein for the MR fluid coupling 200 may be advantageous in that the use of a cylindrical annular space and rotor/stator combination promotes reduced particle separation at high rotary velocities. The use of an MR fluid coupling reduces the weight of the system since a typically used electric motor and high current power electronics may be eliminated in the activation of braking functions. The use of a MR clutch with a drum-like rotor ring tends to reduce the effects of centrifugal forces on the MR fluid, thereby reducing the tendency for the magnetic particles of the MR fluid to separate from the carrier fluid. The gap(s) on either side of the drum rotor that are filled with MR fluid are thin in the radial direction, which tends to reduce centrifugal separation effects. Slip across the clutch, which shears the fluid in these thin gaps, keeps the fluid mixed. The use of the MR fluid reduces the number of parts required and thus puts less stress on the mechanical parts. There are less packaging problems with the stationary coil MR fluid coupling integrated into the torque-vectoring differential. The current and hence the power required to operate the torque-vectoring differential are minimized thereby reducing power consumption. In addition, the sealing methods described herein prevent leaks of MR fluid.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A magnetorheological (MR) fluid coupling for vectoring torque with respect to a shaft capable of rotary motion, the coupling comprising:
   a stator;
   a rotor having a rotational degree of freedom with respect to the stator, the rotor configured for physical communication with the shaft, the stator and rotor defining an annular space therebetween and being directly coupled via a MR fluid disposed within the annular space located directly between the rotor and the stator, the annular space comprising at least two annular spaces disposed on opposing sides of the rotor and wherein the two annular spaces are in fluid communication with each other and with a reservoir that contains a MR fluid; and
   a magnetic field generator in field communication with the MR fluid and disposed to produce a substantially radially directed magnetic field across the annular space;
   wherein the rotor is rotationally responsive to the application of a magnetic field at the MR fluid.

2. The coupling of claim 1, wherein:
   the suitor comprises two concentric cylindrical surfaces that further define the annular space, the MR fluid being disposed within the annular space.

3. The coupling of claim 2, wherein:
   the rotor comprises a rotor ring comprising two concentric cylindrical surfaces that further define the annular space, such that the two concentric cylindrical surfaces of the rotor ring and the two concentric cylindrical surfaces of the stator define a double annular space; and
   the double annular space is oriented parallel to the axis of rotation of the rotor ring.

4. The coupling of claim 1, wherein:
   the stator and the rotor comprise portions that comprise non-magnetic material; and
   the annular space is sized to contain less than or equal to about 200 cubic centimeters of the MR fluid.

5. The coupling of claim 1, wherein:
   in response to field excitation at the magnetic field generator, rotary motion of the rotor relative to the stator is restrained by an increase in shear strength of the MR fluid proximate the stator; and
   in response to a lack of field excitation at the magnetic field generator, rotary motion of the rotor relative to the stator is unrestrained by the MR fluid proximate the stator.

6. The coupling of claim 1, wherein:
   the magnetic field generator is disposed at the stator, the rotor, or at both the stator and the rotor.

7. The coupling of claim 1, wherein:
   the coupling comprises at feast two magnetic field generators.

8. The coupling of claim 1, wherein:
   the annular space is in fluid communication with a reservoir that contains the MR fluid.

9. The coupling of claim 1, wherein:
   the magnetic field generator is insulated to protect it from the abrasive effects of magnetic particles within the MR fluid.

10. The coupling of claim 1, wherein:
    the reservoir is sealed by a chamber having a labyrinth-like structure.

11. The coupling of claim 1, wherein:
    the rotor has a drum-like configuration.

12. The coupling of claim 1, wherein:
    the stator and the rotor have axes in a single plane.

13. The coupling of claim 1, wherein:
    the annular space is cylindrical in shape.

14. The coupling of claim 3, wherein:
    the double annular space comprises a first annular space on one side of the rotor ring and a second annular space on an opposing side of the rotor ring, the first annular space disposed closer to an axis of the shaft than the second annular space.

15. The coupling of claim 1, wherein:
    an axial cross-section of the rotor comprises a "T" shaped profile, each branch of the "T" cooperating with the stator to define the annular space, and the central leg of the "T" configured for physical communication with the shaft.

16. The coupling of claim 15, wherein:
    each branch of the "T" defines an outer cylindrical surface and an inner cylindrical surface, the inner cylindrical surfaces cooperating with the stator to define a first annular space, the outer cylindrical surfaces cooperating with the stator to define a second annular space, the first annular space disposed closer to an axis of the shaft than the second annular space.

17. A magnetorheological (MR) fluid coupling for vectoring torque with respect to a shaft capable of rotary motion, the coupling comprising:
    a stator;
    a rotor having a rotational degree of freedom with respect to the stator, the rotor having an axial cross-section comprising a "T" shaped profile, each branch of the "T" cooperating with the stator to define an annular space located directly between each branch of the "T" and the stator, the central leg of the "T" disposed in direct mechanical communication with the shaft wherein each branch of the "T" defines an outer cylindrical surface and an inner cylindrical surface, the inner cylindrical surfaces cooperating with the stator to define a first annular space, the outer cylindrical surfaces cooperating with the stator to define a second annular space, the first annular space disposed closer to an axis of the shaft than the second annular space;
    a MR fluid disposed within the annular space, the MR fluid directly coupling the rotor with the stator; and
    a magnetic field generator in field communication with the MR fluid and disposed to produce a substantially radially directed magnetic field across the annular space;

wherein the rotor is rotationally responsive to application of a magnetic field at the MR fluid.

18. A magnetorheological (MR) fluid coupling for vectoring torque with respect to a shaft capable of rotary motion, the coupling comprising:
- a stator;
- a rotor having a rotational degree of freedom with respect to the stator, the rotor configured for physical communication with the shaft, the stator and rotor defining an annular space therebetween and being coupled via a MR fluid disposed within the annular space, the annular space comprising a first annular space on one side of the rotor and a second annular space on an opposing side of the rotor, the first annular space disposed closer to an axis of the shaft than the second annular space; and
- a magnetic field generator in field communication with the MR fluid and disposed to produce a substantially radially directed magnetic field across the annular space;

wherein the rotor is rotationally responsive to the application of a magnetic field at the MR fluid.

* * * * *